Jan. 2, 1940. H. HIRTH 2,185,848

ENGINE CYLINDER MOUNTING

Filed June 22, 1937

Inventor
Hellmuth Hirth
by Michaelis & Michaelis
Attys.

Patented Jan. 2, 1940

2,185,848

UNITED STATES PATENT OFFICE 2,185,848

ENGINE CYLINDER MOUNTING

Hellmuth Hirth, Stuttgart, Germany, assignor to Hirth-Motoren G. m. b. H., Stuttgart-Zuffenhausen, Germany Application June 22, 1937, Serial No. 149,640
In Germany June 23, 1936

3 Claims. (Cl. 121—194)

My invention relates to piston engines driven by a suitable driving fluid and quite particularly to internal combustion engines. It deals more particularly with the means for fixing the cylinder head on the cylinder.

It is an object of my invention to provide an arrangement in which the cylinder of such engines and more especially the air-cooled heads of the cylinders of light weight engines, which are made as a rule from light metals and, more especially in heated condition, possess a comparatively low mechanical strength, can be fixed on the cylinders in a particularly simple and efficient manner.

Hitherto the head was fixed as a rule to the cylinder by means of a few, for instance four, strong screw bolts and nuts which pulled the head down onto the cylinder. In this arrangement the heads were subject to distortion, which frequently resulted in leakage between the head and the cylinder. The valve seats leaked in some places and eventually even the head would break. Any distortions of the heads would under certain circumstances also influence the cylinder proper, causing the inner sliding surface of the cylinder to get out of true or become wavy and damaging the piston.

My invention has for one of its purposes to avoid these drawbacks by so connecting the cylinder head, the cylinder and the crank case with each other as to prevent obnoxious distortions from arising. I obtain this by uniting two stay bolts into a U-shaped strap having a curved portion and two depending leg portions, the curved portion embracing the cylinder head and resting on a suitable seat provided on the cylinder head and the two leg portions extending downward parallel to the cylinder axis into the crankcase, where they are secured by a means permitting the bolts to be tensioned.

I prefer curving that part of the strap, which embraces the cylinder head, according to a continuous curve, for instance a half-circle or half-ellipse. Two such straps used for fixing the head to the cylinder and crank case may cross each other in the center of the cylinder head or may extend around the head in parallel.

In this arrangement the forces transmitted by the screw bolts, which hitherto acted on several individual points, are distributed over larger surfaces. Apart therefrom the peculiar shape of the screw bolts, which are curved hairpin fashion, is utilized for exerting on the head concentric pressure which counteracts the tensional forces resulting from the bending stresses.

In the drawing affixed to this specification and forming part thereof two embodiments of my invention are illustrated diagrammatically by way of example.

In the drawing

Fig. 1 is a front elevation, partly in section, of one embodiment,

Fig. 2 being a plan view, partly in section.

Figure 3:
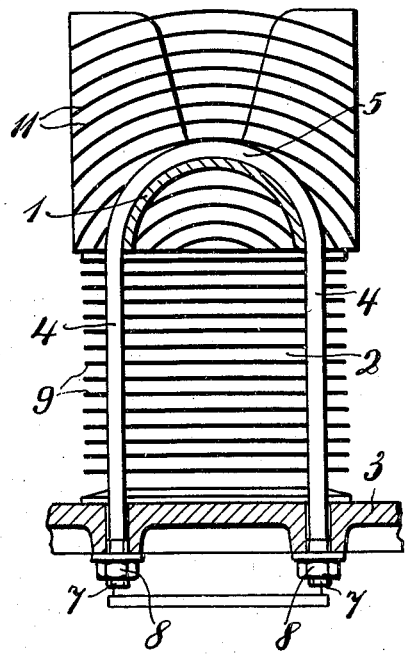
Fig. 3 is a front elevation, partly in section, of the second embodiment.

In both embodiments shown in the drawing 1 is the cylinder head, 2 is the cylinder, 3 is a wall of the crank case, to which the cylinder is fixed, 4 are stay bolts connecting the three parts with each other, these bolts being curved into U-shaped strap form, the curved portions 5 embracing the cylinder head 1, while the free ends extending downwardly parallel to the cylinder axis and through the crank case wall and enlarged at 7 and formed here with screw thread or with a head, a nut such as 8 in Fig. 3, or a cap screw, a clamp or the like serving to exert tensional force on the straps.

Figure 1:
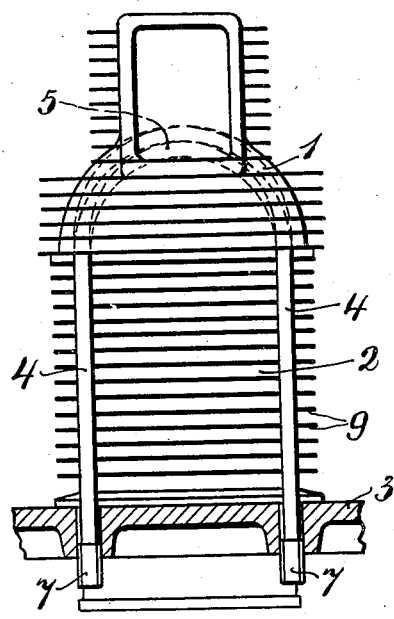
Figure 2:
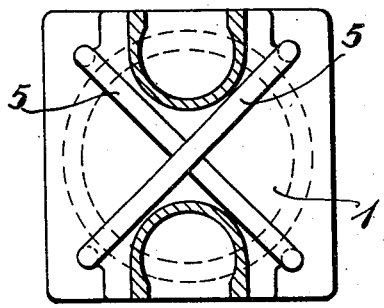

In the embodiment of the Figs. 1 and 2 the curved middle portions 5 of the strap-shaped bolts 4 cross one another, and the part 5 is here supported throughout its length by a suitable seat formed on the cylinder head in such manner that no bending stresses can arise, but mere tensional stresses. The bolts 4 enter and leave the cylinder head 1 in tangential direction (Figs. 1 and 3) and therefore do not exert any bending force on these points of the head. The curvature of the bolts and of the surfaces supporting same should be a continuous one, either according to a half-circle or a half-ellipse.

When screwing up the bolts 4, the curved part 5 exerts pressure in radial direction on its support and thus compresses the material at the very places at which otherwise tensional strains would arise, so that here the material is considerably relieved.

Figure 4:
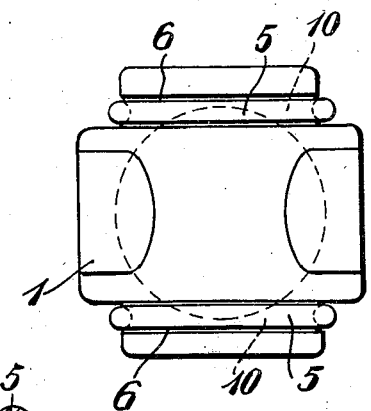
Fig. 4 is a plan view of Fig. 3.

If in view of auxiliary devices mounted on the cylinder head 1 it appears impossible or undesirable to arrange the bolts with the curved parts 5 crossing each other, as shown in Fig. 2, the bolts 4 may also be arranged with the curved parts 5 extending in parallel, as shown in Figs. 3 and 4, where they hold the cylinder head together in one direction, while in the direction at right angles thereto the head is stiffened sufficiently by the auxiliary devices.

Figure 5:
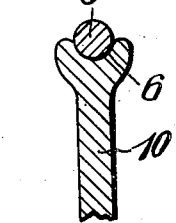
Fig. 5 is a section illustrating a detail on a larger scale.

As can be seen from Fig. 4, the cylinder head 1 is formed on opposite sides of the cylinder with seating grooves 6 which support the curved portions 5 of the U-shaped retaining bolts. These grooves must be supported by strong walls in order to uniformly transfer the pressure onto the packing surface between the head and the cylinder. Fig. 5 is a section of the part 5, the groove 6 and wall 10 illustrating this arrangement.

The new way of fixing the head to the cylinder is designed quite especially for use in connection with the air-cooled cylinder heads for light engines, which are provided with cooling ribs 9. As shown more particularly in Fig. 3, the head is here provided also with cooling ribs 11 of a peculiar configuration, which are curved in the direction of the curved parts 5 of the bolts, whereby their cooling effect is enhanced, since curved ribs possess a larger cooling surface than plane ribs. Apart therefrom the curved ribs 11 have a superior stiffening effect on the cylinder 1. I prefer shaping these ribs according to concentric circles about a point on the middle line of the cylinder 2.

The new mode of fixation of the cylinder heads can however also be used with advantage in connection with water-cooled cylinder heads, and its application is not confined to internal combustion engines.

In the drawing the bolts 4, 5 are shown as having a cylindrical cross section, which will obviously be the most favorable form. However bolts of different cross sections, for instance elliptical or rectangular, might be used as well.

I wish it to be understood that I do not desire to be limited to the exact details of construction shown and described for obvious modifications will occur to a person skilled in the art.

I claim:

1. In an engine in combination, a crank case, a cylinder mounted on and supported by said crank case, a cylinder head on said cylinder provided with a seating portion, a U-shaped screw bolt having a curved portion embracing said seating portion and downwardly depending leg portions extending through the wall of and into said crank case and nuts on the ends of said screw bolt arranged to press said head down on said cylinder and said cylinder on said crank case.

2. The combination of claim 1, in which the cylinder head is provided with seats on the opposite sides of said head and two U-bolts extend in parallel around the cylinder head in contact with said seats and into contact with the crank case.

3. The combination of claim 1, in which two U-shaped screw bolts extend around the cylinder head embracing the seating portions of the cylinder head with their curved parts crossing each other.

HELLMUTH HIRTH.